May 5, 1931.  W. J. PEARMAIN  1,804,113
CLUTCH
Filed Jan. 6, 1930
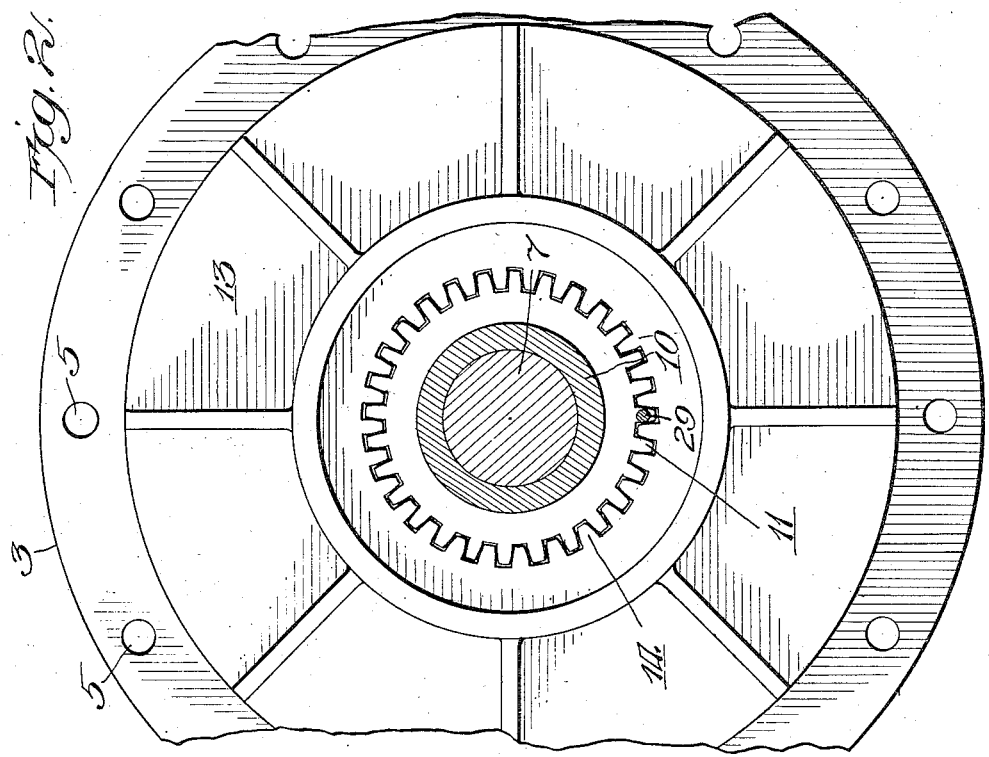
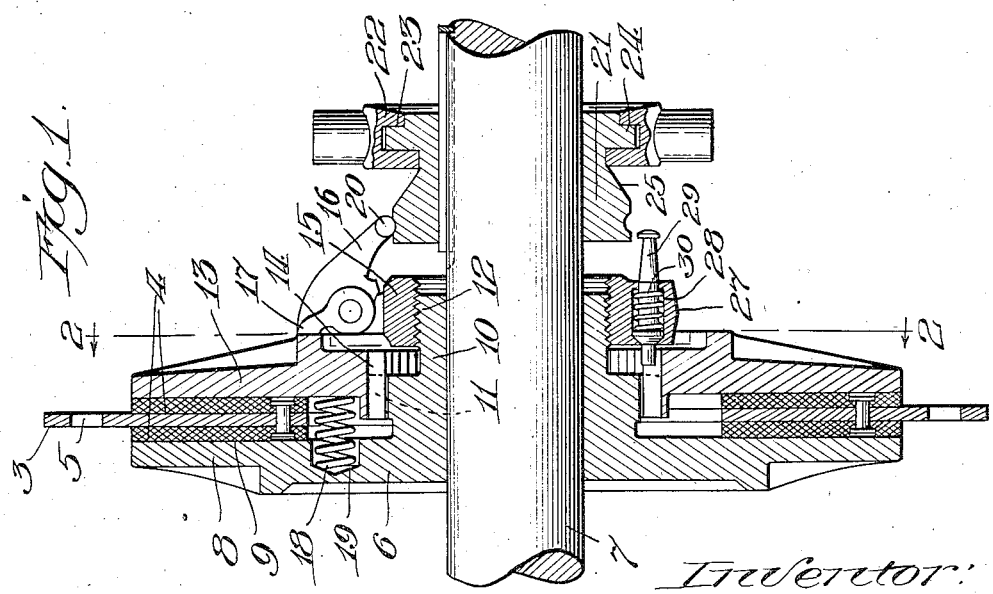
Inventor:
William J. Pearmain
by Rector Hibben Davis and Macauley
attys Patented May 5, 1931

1,804,113

UNITED STATES PATENT OFFICE

WILLIAM J. PEARMAIN, OF RACINE, WISCONSIN, ASSIGNOR TO TWIN DISC CLUTCH COMPANY, OF RACINE, WISCONSIN, A CORPORATION OF WISCONSIN

CLUTCH

Application filed January 6, 1930. Serial No. 418,697.

My invention relates more particularly to that form of clutch in which one of the rotary members to be connected and disconnected is provided with a friction plate and the other with a pair of clamping plates and means whereby the clamping plates may be engaged with and disengaged from the friction plate. And the invention has to do more particularly with means for adjusting the clamping plate operating means for taking up wear. It consists in the details of construction hereinafter described and pointed out in the claim.

In the views accompanying and forming a part of this specification, Figure 1 is an axial section through a clutch embodying the invention and Fig. 2 is a transverse section on the plane of the line 2—2 of Fig. 1, looking in the direction of the arrows.

In the specific embodiment of the invention illustrated, numeral 3 indicates a friction plate provided with facings 4 of friction material and formed with holes 5 for attachment to a flywheel or other rotary part. 6 is a clamping plate adapted to be keyed or otherwise secured to a shaft such as shaft 7 and comprises an annular flange 8 having a flat face 9 for engaging the friction disk and a hub 10 by which it is secured to the shaft. Adjacent, but spaced from, the face 9 of the clamping member the hub is formed with an annular series of teeth 11, similar to gear teeth beyond which the hub is of reduced diameter as at 12 and exteriorly threaded. On the opposite side of the friction plate a second clamping plate 13 is mounted on the hub of the first mentioned clamping plate for axial movement thereon into and out of engagement with the friction disk. On its inner periphery it is provided with axially elongated teeth 14 corresponding to and engaging with the abovementioned teeth 11 on the hub of clamping member 6. Thus the two clamping members have relative axial movement but turn together.

An internally threaded ring or collar 15 is screwed upon the threaded end 12, above mentioned, of the hub and an annular series of levers 16, in this instance three in number, is pivoted upon the ring, the shorter arms 17 of which levers engage the floating clamping plate 13 and when properly actuated press the latter into close contact with the friction disk. An annular series of three or more springs 18 located in pockets 19 in the fixed clamping plate 6 serves to separate the clamping plates from the friction disk when pressure of the levers is released. The longer arms of the levers terminate in rounded ends 20 which are engaged by a sliding sleeve 21 which may be shifted axially of the shaft in any approved manner, as by a ring 22 grooved at 23 to receive the annular flange 24 of the sleeve. A fork or other approved means may be used for actuating ring 22. The sleeve 21 is frusto-conical at 25 and when shifted to the right, into the position shown in Fig. 1, swings the levers 16 to press the clamping plate 13 into engagement with the friction disk. But when the sleeve 21 is shifted to the left it permits the levers to release the pressure upon clamping plate 13 when the latter will be pressed away from the friction disk, as previously explained.

In accordance with my invention the clamping plate 13 adjacent the hub is made somewhat thicker than would otherwise be necessary and the teeth 14 thereof correspondingly prolonged beyond what is necessary for proper engagement with the teeth upon the hub of the clamping plate 6 for a purpose which will now be explained. The collar or annulus 15, above mentioned, is enlarged at 27 and the enlargement bored out at 28 to receive a locking pin 29. The locking pin is surrounded by a coiled spring 30 within the cavity or bore 28 by which the pin is normally maintained in the position shown in Fig. 1. The end of the pin 29 is reduced to a size which will permit it to enter between the extended ends of adjacent teeth 14 on the floating clamping plate and the pin is so located as to register with such spaces. When, therefore, it is desired to adjust the ring the pin is retracted, the ring adjusted to the desired extent and the pin released and permitted to enter the space with which it is in register.

By thus extending the teeth on the inner periphery of the floating clamping plate and using the extended ends in connection with the pin for locking the ring in adjusted position, the construction is substantially cheapened and simplified.

I claim:

In a clutch of the class described a relatively fixed clamping plate comprising a hub having peripheral teeth thereon and a threaded end, a floating clamping plate having internal teeth engaging the teeth of the fixed plate, an interiorly threaded ring on the threaded end of the hub, levers on the ring engaging the floating plate, means for actuating the levers and a locking pin on the ring adapted to engage between the teeth on the floating plate.

In testimony whereof, I have subscribed my name.

WILLIAM J. PEARMAIN.